US008102568B2

(12) United States Patent
Silverbrook

(10) Patent No.: US 8,102,568 B2
(45) Date of Patent: *Jan. 24, 2012

(54) SYSTEM FOR CREATING GARMENTS USING CAMERA AND ENCODED CARD

(75) Inventor: Kia Silverbrook, Balmain (AU)

(73) Assignee: Silverbrook Research Pty Ltd, Balmain, New South Wales (AU)

( * ) Notice: Subject to any disclaimer, the term of this patent is extended or adjusted under 35 U.S.C. 154(b) by 0 days.

This patent is subject to a terminal disclaimer.

(21) Appl. No.: 13/108,986

(22) Filed: May 17, 2011

(65) Prior Publication Data

US 2011/0216332 A1  Sep. 8, 2011

Related U.S. Application Data

(63) Continuation of application No. 12/422,892, filed on Apr. 13, 2009, now Pat. No. 7,965,416, which is a continuation of application No. 11/525,862, filed on Sep. 25, 2006, now Pat. No. 7,525,687, which is a continuation of application No. 10/326,308, filed on Dec. 23, 2002, now abandoned, which is a continuation of application No. 09/112,759, filed on Jul. 10, 1998, now abandoned.

(30) Foreign Application Priority Data

Jul. 15, 1997 (AU) ..................... PO8027

(51) Int. Cl.
*G06F 15/00* (2006.01)
*G06K 1/00* (2006.01)
(52) U.S. Cl. ............. 358/1.9; 348/207.1; 348/207.11; 348/207.2

(58) Field of Classification Search .............. 358/1.9, 358/1.15, 452; 348/207.2
See application file for complete search history.

(56) References Cited

U.S. PATENT DOCUMENTS

| | | | |
|---|---|---|---|
| 3,573,437 A | 4/1971 | Scuitto et al. |
| 3,663,801 A | 5/1972 | Wahli et al. |
| 3,701,098 A | 10/1972 | Acker |
| 3,731,062 A | 5/1973 | Reilly, Jr. |
| 3,735,350 A | 5/1973 | Lemelson |
| 3,737,629 A | 6/1973 | See |
| 3,748,939 A | 7/1973 | Feinstein et al. |
| 3,760,162 A | 9/1973 | Holter |
| 3,778,541 A | 12/1973 | Bowker |
| 3,852,572 A | 12/1974 | Nicould |
| 3,857,019 A | 12/1974 | Holtey |
| 3,866,217 A | 2/1975 | Bennett, Jr. |
| 3,893,173 A | 7/1975 | Taggart et al. |
| 3,896,691 A | 7/1975 | Granger et al. |
| 3,916,420 A | 10/1975 | Brown et al. |

(Continued)

FOREIGN PATENT DOCUMENTS

EP 0382044 A2 8/1990

(Continued)

*Primary Examiner* — Charlotte M Baker
*Assistant Examiner* — Fred Guillermety

(57) ABSTRACT

A garment creation system includes a card, a camera and a processing system. The has printed thereon a depiction of a garment and encoded information. The encoded information carries instructions for generating garments pieces corresponding to the garment and manipulating an input image so as to be mapped onto the garment pieces. The camera and processing system are configured for: optically reading the encoded information on said card; capturing an image; mapping the captured image onto the garment pieces; generating print data for the garment pieces; and communicating the print data to a garment fabric printer.

4 Claims, 4 Drawing Sheets

U.S. PATENT DOCUMENTS

| | | |
|---|---|---|
| 3,943,563 A | 3/1976 | Lemelson |
| 3,970,803 A | 7/1976 | Kinzie, Jr. et al. |
| 4,000,239 A | 12/1976 | Hamana et al. |
| 4,048,617 A | 9/1977 | Neff |
| 4,088,981 A | 5/1978 | Gott |
| 4,092,654 A | 5/1978 | Alasia |
| 4,161,749 A | 7/1979 | Erlichman |
| 4,173,401 A | 11/1979 | Harvey |
| 4,200,867 A | 4/1980 | Hill |
| 4,213,694 A | 7/1980 | Kuseski |
| 4,234,214 A | 11/1980 | Lee |
| 4,244,006 A | 1/1981 | Kitahara et al. |
| 4,253,476 A | 3/1981 | Sato |
| 4,262,284 A | 4/1981 | Stieff et al. |
| 4,270,853 A | 6/1981 | Hatada et al. |
| 4,402,150 A | 9/1983 | Sullivan |
| 4,414,316 A | 11/1983 | Conley |
| 4,429,320 A | 1/1984 | Hattori et al. |
| 4,454,517 A | 6/1984 | Kagaya |
| 4,455,609 A | 6/1984 | Inamura et al. |
| 4,463,359 A | 7/1984 | Ayata et al. |
| 4,488,563 A | 12/1984 | Morifuji et al. |
| 4,494,862 A | 1/1985 | Tanaka |
| 4,494,864 A | 1/1985 | Smith et al. |
| 4,500,183 A | 2/1985 | Tanikawa |
| 4,500,919 A | 2/1985 | Shreiber |
| 4,511,907 A | 4/1985 | Fukuchi |
| 4,518,235 A | 5/1985 | Reed et al. |
| 4,534,142 A | 8/1985 | Drefahl |
| 4,546,434 A | 10/1985 | Gioello |
| 4,558,326 A | 12/1985 | Kimura et al. |
| 4,580,721 A | 4/1986 | Coffee et al. |
| 4,581,710 A | 4/1986 | Hasslemeier |
| 4,592,938 A | 6/1986 | Benoit |
| 4,596,039 A | 6/1986 | Mitchell et al. |
| 4,632,585 A | 12/1986 | Oyamatsu et al. |
| 4,639,738 A | 1/1987 | Young et al. |
| 4,640,529 A | 2/1987 | Katz |
| 4,641,980 A | 2/1987 | Matsumoto |
| 4,652,935 A | 3/1987 | Endoh et al. |
| 4,665,556 A | 5/1987 | Fukushima et al. |
| 4,683,477 A | 7/1987 | Braun et al. |
| 4,688,105 A | 8/1987 | Bloch et al. |
| 4,689,642 A | 8/1987 | Sugitani |
| 4,689,683 A | 8/1987 | Efron |
| 4,692,394 A | 9/1987 | Drexler |
| 4,703,332 A | 10/1987 | Crotti et al. |
| 4,707,713 A | 11/1987 | Ayata et al. |
| 4,724,307 A | 2/1988 | Dutton et al. |
| 4,728,978 A | 3/1988 | Inoue et al. |
| 4,740,269 A | 4/1988 | Berger et al. |
| 4,754,487 A | 6/1988 | Newmuis |
| 4,762,986 A | 8/1988 | Suda et al. |
| 4,771,342 A | 9/1988 | Beesley |
| 4,783,700 A | 11/1988 | Nagane |
| 4,783,823 A | 11/1988 | Tasaki et al. |
| 4,788,563 A | 11/1988 | Omo et al. |
| 4,791,443 A | 12/1988 | Foley et al. |
| 4,796,038 A | 1/1989 | Allen et al. |
| 4,819,395 A | 4/1989 | Sugita et al. |
| 4,833,599 A | 5/1989 | Colwell et al. |
| 4,835,388 A | 5/1989 | Bruml et al. |
| 4,837,628 A | 6/1989 | Sasaki |
| 4,845,770 A | 7/1989 | Koshida |
| 4,853,967 A | 8/1989 | Mandeville |
| 4,860,375 A | 8/1989 | McCubbrey et al. |
| 4,861,031 A | 8/1989 | Simms |
| 4,868,676 A | 9/1989 | Matsuura et al. |
| 4,897,719 A | 1/1990 | Griffin |
| 4,897,724 A | 1/1990 | Veldhuis |
| 4,902,880 A | 2/1990 | Garczynski et al. |
| 4,904,100 A | 2/1990 | Enix |
| 4,914,452 A | 4/1990 | Fukawa |
| 4,937,676 A | 6/1990 | Finelli et al. |
| 4,949,189 A | 8/1990 | Ohmori |
| 4,954,910 A | 9/1990 | Ueno |
| 4,965,596 A | 10/1990 | Nagoshi et al. |
| 4,975,969 A | 12/1990 | Tal |
| 4,977,459 A | 12/1990 | Ebinuma et al. |
| 4,983,996 A | 1/1991 | Kinoshita |
| 4,987,030 A | 1/1991 | Saito et al. |
| 4,991,205 A | 2/1991 | Lemelson |
| 4,993,405 A | 2/1991 | Takamura et al. |
| 4,999,647 A | 3/1991 | Wood et al. |
| 5,005,998 A | 4/1991 | Takanashi et al. |
| 5,009,626 A | 4/1991 | Katz |
| 5,016,112 A | 5/1991 | Nakajima et al. |
| 5,018,072 A | 5/1991 | Ibamoto et al. |
| 5,021,892 A | 6/1991 | Kita et al. |
| 5,031,049 A | 7/1991 | Toyama et al. |
| 5,035,325 A | 7/1991 | Kitsuki |
| 5,035,929 A | 7/1991 | Myers |
| 5,036,472 A | 7/1991 | Buckley et al. |
| 5,043,748 A | 8/1991 | Katayama et al. |
| 5,049,898 A | 9/1991 | Arthur et al. |
| 5,053,814 A | 10/1991 | Takano et al. |
| 5,058,856 A | 10/1991 | Gordon et al. |
| 5,091,966 A | 2/1992 | Bloomberg et al. |
| 5,101,096 A | 3/1992 | Ohyama et al. |
| 5,103,311 A | 4/1992 | Sluijter et al. |
| 5,107,290 A | 4/1992 | Ohsawa |
| 5,111,288 A | 5/1992 | Blackshear |
| 5,115,888 A | 5/1992 | Schneider |
| 5,119,115 A | 6/1992 | Buat et al. |
| 5,121,139 A | 6/1992 | Burke |
| 5,121,349 A | 6/1992 | Naito |
| 5,124,692 A | 6/1992 | Sasson |
| 5,132,798 A | 7/1992 | Yoshimura et al. |
| 5,134,495 A | 7/1992 | Frazier et al. |
| 5,138,459 A | 8/1992 | Roberts et al. |
| 5,148,534 A | 9/1992 | Comerford |
| 5,151,726 A | 9/1992 | Iwashita et al. |
| 5,153,532 A | 10/1992 | Albers et al. |
| 5,154,956 A | 10/1992 | Fradrich |
| 5,160,577 A | 11/1992 | Deshpande |
| 5,164,827 A | 11/1992 | Paff |
| 5,172,423 A | 12/1992 | France |
| 5,175,808 A | 12/1992 | Sayre |
| 5,179,389 A | 1/1993 | Arai et al. |
| 5,182,548 A | 1/1993 | Haeberli |
| 5,184,169 A | 2/1993 | Nishitani |
| 5,191,640 A | 3/1993 | Plass |
| 5,204,944 A | 4/1993 | Wolberg et al. |
| 5,206,919 A | 4/1993 | Keating |
| 5,208,610 A | 5/1993 | Su et al. |
| 5,216,490 A | 6/1993 | Greiff et al. |
| 5,220,352 A | 6/1993 | Yamamoto et al. |
| 5,220,400 A | 6/1993 | Anderson et al. |
| 5,221,833 A | 6/1993 | Hecht |
| 5,224,179 A | 6/1993 | Denker et al. |
| 5,235,428 A | 8/1993 | Hirota et al. |
| 5,239,292 A | 8/1993 | Willan |
| 5,241,165 A | 8/1993 | Drexler |
| 5,241,372 A | 8/1993 | Ohba |
| 5,243,174 A | 9/1993 | Veeneman et al. |
| 5,243,370 A | 9/1993 | Slater |
| 5,243,381 A | 9/1993 | Hube |
| 5,245,365 A | 9/1993 | Woodard et al. |
| 5,247,611 A | 9/1993 | Norden-Paul et al. |
| 5,260,735 A | 11/1993 | Ishikawa et al. |
| 5,266,781 A | 11/1993 | Warwick et al. |
| 5,275,877 A | 1/1994 | Isayev |
| 5,276,472 A | 1/1994 | Bell et al. |
| 5,278,608 A | 1/1994 | Taylor et al. |
| 5,280,160 A | 1/1994 | Yamamoto et al. |
| 5,282,044 A | 1/1994 | Misawa et al. |
| 5,282,051 A | 1/1994 | Walker |
| 5,288,980 A | 2/1994 | Patel et al. |
| 5,301,043 A | 4/1994 | Ichikawa |
| 5,315,316 A | 5/1994 | Khormaee |
| 5,317,146 A | 5/1994 | Isobe |
| 5,318,370 A | 6/1994 | Nehowig |
| 5,327,260 A | 7/1994 | Shimomae |
| 5,343,386 A | 8/1994 | Barber |
| 5,345,505 A | 9/1994 | Pires |
| 5,347,403 A | 9/1994 | Uekusa |
| 5,356,971 A | 10/1994 | Sagawa et al. |

| Patent No. | Date | Inventor |
|---|---|---|
| 5,359,387 A | 10/1994 | Hicks |
| 5,363,212 A | 11/1994 | Taniuchi et al. |
| 5,365,312 A | 11/1994 | Hillmann et al. |
| 5,369,261 A | 11/1994 | Shamir |
| 5,384,899 A | 1/1995 | Amit |
| 5,392,365 A | 2/1995 | Steinkirchner |
| 5,396,286 A | 3/1995 | Ishizuka |
| 5,398,063 A | 3/1995 | Yamana |
| 5,398,131 A | 3/1995 | Hall et al. |
| 5,398,315 A | 3/1995 | Johnson et al. |
| 5,402,527 A | 3/1995 | Bigby et al. |
| 5,412,197 A | 5/1995 | Smith |
| 5,412,402 A | 5/1995 | Searby et al. |
| 5,414,529 A | 5/1995 | Terada et al. |
| 5,420,607 A | 5/1995 | Miller et al. |
| 5,420,635 A | 5/1995 | Konishi et al. |
| 5,428,423 A | 6/1995 | Clark |
| 5,432,896 A | 7/1995 | Hwong et al. |
| 5,434,618 A | 7/1995 | Hayashi et al. |
| 5,434,621 A | 7/1995 | Yu |
| 5,436,657 A | 7/1995 | Fukuoka |
| 5,438,359 A | 8/1995 | Aoki et al. |
| 5,438,430 A | 8/1995 | Mackinlay et al. |
| 5,442,188 A | 8/1995 | Brimbal et al. |
| 5,442,567 A | 8/1995 | Small |
| 5,444,230 A | 8/1995 | Baldwin et al. |
| 5,444,543 A | 8/1995 | Sakano |
| 5,450,365 A | 9/1995 | Adachi et al. |
| 5,452,033 A | 9/1995 | Balling et al. |
| 5,457,515 A | 10/1995 | Quadracci et al. |
| 5,457,554 A | 10/1995 | Faris |
| 5,459,819 A | 10/1995 | Watkins et al. |
| 5,461,440 A | 10/1995 | Toyoda et al. |
| 5,462,375 A | 10/1995 | Isobe et al. |
| 5,463,470 A | 10/1995 | Terashita et al. |
| 5,466,918 A | 11/1995 | Ray et al. |
| 5,467,118 A | 11/1995 | Gragg et al. |
| 5,475,318 A | 12/1995 | Marcus et al. |
| 5,477,264 A | 12/1995 | Sarbadhikari et al. |
| 5,479,015 A | 12/1995 | Rudman et al. |
| 5,482,389 A | 1/1996 | Bickoff et al. |
| 5,483,379 A | 1/1996 | Svanberg et al. |
| 5,488,223 A | 1/1996 | Austin et al. |
| 5,489,935 A | 2/1996 | Dornier |
| 5,489,995 A | 2/1996 | Iso et al. |
| 5,493,409 A | 2/1996 | Maeda et al. |
| 5,495,568 A | 2/1996 | Beavin |
| 5,502,485 A | 3/1996 | Suzuki |
| 5,502,529 A | 3/1996 | Zander |
| 5,502,577 A | 3/1996 | Mackinlay et al. |
| 5,506,603 A | 4/1996 | Kawano et al. |
| 5,506,620 A | 4/1996 | Ozawa |
| 5,512,951 A | 4/1996 | Torii |
| 5,513,117 A | 4/1996 | Small |
| 5,515,101 A | 5/1996 | Yoshida |
| 5,515,104 A | 5/1996 | Okada |
| 5,517,222 A | 5/1996 | Sugiyama et al. |
| 5,517,241 A | 5/1996 | Adachi et al. |
| 5,521,372 A | 5/1996 | Hecht et al. |
| 5,521,710 A | 5/1996 | Strossman |
| 5,523,780 A | 6/1996 | Hirosawa et al. |
| 5,524,194 A | 6/1996 | Chida et al. |
| 5,528,339 A | 6/1996 | Buhr et al. |
| 5,529,279 A | 6/1996 | Beatty et al. |
| 5,533,172 A | 7/1996 | Hurtz et al. |
| 5,534,900 A | 7/1996 | Ohno et al. |
| 5,534,962 A | 7/1996 | Zander |
| 5,537,144 A | 7/1996 | Faris |
| 5,537,294 A | 7/1996 | Siwinski |
| 5,539,456 A | 7/1996 | Ishii |
| 5,542,487 A | 8/1996 | Schultz et al. |
| 5,549,740 A | 8/1996 | Takahashi et al. |
| 5,552,837 A | 9/1996 | Mankovitz |
| 5,554,432 A | 9/1996 | Sandor et al. |
| 5,555,428 A | 9/1996 | Radigan et al. |
| 5,555,496 A | 9/1996 | Tackbary et al. |
| 5,557,310 A | 9/1996 | Kurata et al. |
| 5,559,714 A | 9/1996 | Banks et al. |
| 5,559,932 A | 9/1996 | Machida et al. |
| 5,561,604 A | 10/1996 | Buckley et al. |
| 5,563,643 A | 10/1996 | Carlotta et al. |
| 5,563,722 A | 10/1996 | Norris |
| 5,565,900 A | 10/1996 | Cowger et al. |
| 5,566,906 A | 10/1996 | Kamada et al. |
| 5,570,130 A | 10/1996 | Horii et al. |
| 5,570,435 A | 10/1996 | Bloomberg et al. |
| 5,572,310 A | 11/1996 | Hoberock et al. |
| 5,572,596 A | 11/1996 | Wildes et al. |
| 5,572,635 A | 11/1996 | Takizawa et al. |
| 5,576,783 A | 11/1996 | Lee |
| 5,579,116 A | 11/1996 | Sugiyama et al. |
| 5,579,445 A | 11/1996 | Loce et al. |
| 5,581,773 A | 12/1996 | Glover |
| 5,583,971 A | 12/1996 | Lo |
| 5,587,740 A | 12/1996 | Brennan |
| 5,592,237 A | 1/1997 | Greenway et al. |
| 5,592,597 A | 1/1997 | Kiss |
| 5,594,500 A | 1/1997 | Tanaka et al. |
| 5,598,202 A | 1/1997 | Peterson |
| 5,600,402 A | 2/1997 | Kainen |
| 5,602,377 A | 2/1997 | Beller et al. |
| 5,602,412 A | 2/1997 | Suzuki et al. |
| 5,604,537 A | 2/1997 | Yamazaki et al. |
| 5,606,420 A | 2/1997 | Maeda et al. |
| 5,610,761 A | 3/1997 | Ishibashi et al. |
| 5,613,175 A | 3/1997 | Frankel |
| 5,615,123 A | 3/1997 | Davidson et al. |
| 5,619,030 A | 4/1997 | Shiomi |
| 5,619,622 A | 4/1997 | Audi et al. |
| 5,619,737 A | 4/1997 | Horning et al. |
| 5,621,524 A | 4/1997 | Mitani |
| 5,621,545 A | 4/1997 | Motta et al. |
| 5,621,868 A | 4/1997 | Mizutani et al. |
| 5,624,732 A | 4/1997 | Oshima et al. |
| 5,625,770 A | 4/1997 | Nomura |
| 5,633,678 A | 5/1997 | Parulski et al. |
| 5,634,730 A | 6/1997 | Bobry |
| 5,638,103 A | 6/1997 | Obata et al. |
| 5,642,226 A | 6/1997 | Rosenthal |
| 5,644,341 A | 7/1997 | Fuji et al. |
| 5,644,431 A | 7/1997 | Magee |
| 5,644,557 A | 7/1997 | Akamine et al. |
| 5,646,658 A | 7/1997 | Thiel et al. |
| 5,666,226 A | 9/1997 | Ezra et al. |
| 5,666,411 A | 9/1997 | McCarty |
| 5,678,081 A | 10/1997 | Tanaka |
| 5,679,456 A | 10/1997 | Sakai et al. |
| 5,682,191 A | 10/1997 | Barrett et al. |
| 5,687,304 A | 11/1997 | Kiss |
| 5,688,056 A | 11/1997 | Peyret |
| 5,689,740 A | 11/1997 | Uchiyama |
| 5,692,225 A | 11/1997 | Bernardi et al. |
| 5,696,892 A | 12/1997 | Redmann et al. |
| 5,697,006 A | 12/1997 | Taguchi et al. |
| 5,703,961 A | 12/1997 | Rogina et al. |
| 5,706,049 A | 1/1998 | Moghadam et al. |
| 5,708,900 A | 1/1998 | Yokoyama et al. |
| 5,710,582 A | 1/1998 | Hawkins et al. |
| 5,710,948 A | 1/1998 | Takagi |
| 5,715,228 A | 2/1998 | Takiguchi |
| 5,715,325 A | 2/1998 | Bang et al. |
| 5,717,197 A | 2/1998 | Petrie |
| 5,719,621 A | 2/1998 | Tsunefuji |
| 5,719,970 A | 2/1998 | Aoki et al. |
| 5,726,435 A | 3/1998 | Hara et al. |
| 5,726,693 A | 3/1998 | Sharma et al. |
| 5,729,252 A | 3/1998 | Fraser |
| 5,729,471 A | 3/1998 | Jain et al. |
| 5,731,062 A | 3/1998 | Kim et al. |
| 5,734,154 A | 3/1998 | Jachimowicz et al. |
| 5,734,425 A | 3/1998 | Takizawa et al. |
| 5,742,305 A | 4/1998 | Hackleman |
| 5,745,175 A | 4/1998 | Anderson |
| 5,748,228 A | 5/1998 | Kobayashi et al. |
| 5,748,326 A | 5/1998 | Thompson-Bell et al. |
| 5,748,856 A | 5/1998 | Cariffe et al. |
| 5,750,974 A | 5/1998 | Sasaki et al. |
| 5,751,303 A | 5/1998 | Erickson et al. |

| | | | | | |
|---|---|---|---|---|---|
| 5,751,318 A | 5/1998 | Granzow | 5,896,155 A | 4/1999 | Lebens et al. |
| 5,751,590 A | 5/1998 | Cannon et al. | 5,896,169 A | 4/1999 | Boelart |
| 5,752,114 A | 5/1998 | Saito et al. | 5,896,176 A | 4/1999 | Das et al. |
| 5,753,344 A | 5/1998 | Jacobsen | 5,896,403 A | 4/1999 | Nagasaki et al. |
| 5,754,227 A | 5/1998 | Fukuoka | 5,900,909 A | 5/1999 | Parulski et al. |
| 5,754,690 A | 5/1998 | Jackson et al. | 5,905,529 A | 5/1999 | Inuiya et al. |
| 5,754,700 A | 5/1998 | Kuzma | 5,907,354 A | 5/1999 | Cama et al. |
| 5,755,519 A | 5/1998 | Klinefelter | 5,907,415 A | 5/1999 | Yabe |
| 5,756,978 A | 5/1998 | Soltesz et al. | 5,907,434 A | 5/1999 | Sekine et al. |
| 5,757,388 A | 5/1998 | Stephenson | 5,909,227 A | 6/1999 | Silverbrook |
| 5,757,393 A | 5/1998 | Suzuki | 5,909,248 A | 6/1999 | Stephenson |
| 5,760,814 A | 6/1998 | Kang | 5,909,562 A | 6/1999 | Faget et al. |
| 5,761,726 A | 6/1998 | Guttag et al. | 5,911,056 A | 6/1999 | Faget et al. |
| 5,767,945 A | 6/1998 | Fields et al. | 5,914,748 A | 6/1999 | Parulski et al. |
| 5,768,482 A | 6/1998 | Winter et al. | 5,914,801 A | 6/1999 | Dhuler et al. |
| 5,768,609 A | 6/1998 | Gove et al. | 5,916,358 A | 6/1999 | Bagchi et al. |
| 5,771,245 A | 6/1998 | Zhang | 5,917,542 A | 6/1999 | Moghadam et al. |
| 5,781,708 A | 7/1998 | Austin et al. | 5,917,937 A | 6/1999 | Szeliski et al. |
| 5,781,924 A | 7/1998 | Zaitzeva et al. | 5,917,963 A | 6/1999 | Miyake |
| 5,784,088 A | 7/1998 | Ujita et al. | 5,921,686 A | 7/1999 | Baird et al. |
| 5,784,521 A | 7/1998 | Nakatani et al. | 5,923,406 A | 7/1999 | Brasington et al. |
| 5,787,193 A | 7/1998 | Balasubramanian | 5,923,882 A | 7/1999 | Ho et al. |
| 5,788,388 A | 8/1998 | Cowger et al. | 5,924,737 A | 7/1999 | Schrupp |
| 5,790,193 A | 8/1998 | Ohmori | 5,930,528 A | 7/1999 | Ito et al. |
| 5,790,699 A | 8/1998 | Jackson et al. | 5,933,137 A | 8/1999 | Anderson et al. |
| 5,792,249 A | 8/1998 | Shirota et al. | 5,933,179 A | 8/1999 | Fogle et al. |
| 5,796,429 A | 8/1998 | Suzuki et al. | 5,937,089 A | 8/1999 | Kobayashi |
| 5,801,854 A | 9/1998 | Naylor, Jr. | 5,938,766 A | 8/1999 | Anderson et al. |
| 5,802,413 A | 9/1998 | Stephenson | 5,940,095 A | 8/1999 | Parish et al. |
| 5,805,213 A | 9/1998 | Spaulding et al. | 5,949,426 A | 9/1999 | Rich |
| 5,805,296 A | 9/1998 | Hattori et al. | 5,949,459 A | 9/1999 | Gasvoda et al. |
| 5,805,550 A | 9/1998 | Ohmori | 5,949,467 A | 9/1999 | Gunther et al. |
| 5,805,936 A | 9/1998 | Matsuzaki et al. | 5,949,967 A | 9/1999 | Spaulding et al. |
| 5,809,292 A | 9/1998 | Wilkinson et al. | 5,955,817 A | 9/1999 | Dhuler et al. |
| 5,812,071 A | 9/1998 | Kairouz | 5,956,163 A | 9/1999 | Clarke et al. |
| 5,812,156 A | 9/1998 | Bullock et al. | 5,959,943 A | 9/1999 | Yonezawa |
| 5,815,186 A | 9/1998 | Lewis et al. | 5,960,412 A | 9/1999 | Tackbary et al. |
| 5,818,023 A | 10/1998 | Meyerson et al. | 5,963,104 A | 10/1999 | Buer |
| 5,818,032 A | 10/1998 | Sun et al. | 5,964,156 A | 10/1999 | Smith et al. |
| 5,819,240 A | 10/1998 | Kara | 5,966,134 A | 10/1999 | Arias |
| 5,819,662 A | 10/1998 | Koyabu | 5,966,553 A | 10/1999 | Nishitani et al. |
| 5,822,606 A | 10/1998 | Morton | 5,969,322 A | 10/1999 | Mori et al. |
| 5,822,608 A | 10/1998 | Dieffenderfer et al. | 5,973,751 A | 10/1999 | Ishida et al. |
| 5,824,410 A | 10/1998 | Sakai et al. | 5,974,168 A | 10/1999 | Rushmeier et al. |
| 5,825,383 A | 10/1998 | Abe et al. | 5,974,190 A | 10/1999 | Maeda et al. |
| 5,825,882 A | 10/1998 | Kowalski et al. | 5,974,234 A | 10/1999 | Levine et al. |
| 5,825,947 A | 10/1998 | Sasaki et al. | 5,974,238 A | 10/1999 | Chase, Jr. |
| 5,826,333 A | 10/1998 | Iketani et al. | 5,977,982 A | 11/1999 | Lauzon |
| 5,835,136 A | 11/1998 | Watanabe et al. | 5,978,100 A | 11/1999 | Kinjo |
| 5,835,616 A | 11/1998 | Lobo et al. | 5,978,511 A | 11/1999 | Horiuchi et al. |
| 5,835,641 A | 11/1998 | Sotoda et al. | 5,978,609 A | 11/1999 | Aoki |
| 5,838,331 A | 11/1998 | Debry | 5,980,010 A | 11/1999 | Stephenson |
| 5,841,441 A | 11/1998 | Smith | 5,982,378 A | 11/1999 | Kato |
| 5,845,166 A | 12/1998 | Fellegara et al. | 5,982,424 A | 11/1999 | Simerly et al. |
| 5,847,836 A | 12/1998 | Suzuki | 5,986,671 A | 11/1999 | Fredlund et al. |
| 5,848,255 A | 12/1998 | Kondo | 5,986,698 A | 11/1999 | Nobuoka |
| 5,850,234 A | 12/1998 | Kneezel et al. | 5,986,706 A | 11/1999 | Hirasawa |
| 5,852,502 A | 12/1998 | Beckett | 5,986,718 A | 11/1999 | Barwacz et al. |
| 5,852,673 A | 12/1998 | Young et al. | 5,989,678 A | 11/1999 | Jacobson |
| 5,854,648 A | 12/1998 | Hanabusa | 5,990,973 A | 11/1999 | Sakamoto |
| 5,854,882 A | 12/1998 | Wang | 5,991,429 A | 11/1999 | Coffin et al. |
| 5,859,921 A | 1/1999 | Suzuki | 5,991,865 A | 11/1999 | Longhenry et al. |
| 5,860,036 A | 1/1999 | Stephenson | 5,992,994 A | 11/1999 | Rasmussen et al. |
| 5,860,363 A | 1/1999 | Childers et al. | 5,995,772 A | 11/1999 | Barry et al. |
| 5,864,630 A | 1/1999 | Cosatto et al. | 5,996,893 A | 12/1999 | Soscia |
| 5,866,253 A | 2/1999 | Philipps et al. | 5,997,124 A | 12/1999 | Capps et al. |
| 5,867,213 A | 2/1999 | Ouchi | 5,999,190 A | 12/1999 | Sheasby et al. |
| 5,867,394 A | 2/1999 | LaDue et al. | 5,999,203 A | 12/1999 | Cane et al. |
| 5,870,102 A | 2/1999 | Tarolli et al. | 5,999,697 A | 12/1999 | Murase et al. |
| 5,872,594 A | 2/1999 | Thompon | 6,000,773 A | 12/1999 | Murray et al. |
| 5,874,836 A | 2/1999 | Nowak et al. | 6,000,791 A | 12/1999 | Scheffelin et al. |
| 5,875,034 A | 2/1999 | Shintani et al. | 6,005,582 A | 12/1999 | Gabriel et al. |
| 5,878,292 A | 3/1999 | Bell et al. | 6,006,039 A | 12/1999 | Steinberg et al. |
| 5,881,211 A | 3/1999 | Matsumura | 6,009,188 A | 12/1999 | Cohen et al. |
| 5,884,013 A | 3/1999 | Bosschaerts et al. | 6,011,536 A | 1/2000 | Hertzmann et al. |
| 5,884,118 A | 3/1999 | Mestha et al. | 6,011,585 A | 1/2000 | Anderson |
| 5,886,371 A | 3/1999 | Shinagawa | 6,011,937 A | 1/2000 | Chaussade et al. |
| 5,894,309 A | 4/1999 | Freeman et al. | 6,014,165 A | 1/2000 | McIntyre et al. |
| 5,894,326 A | 4/1999 | McIntyre et al. | 6,014,170 A | 1/2000 | Pont et al. |

| Patent No. | Kind | Date | Inventor |
|---|---|---|---|
| RE36,589 | E | 2/2000 | Akamine et al. |
| 6,019,449 | A | 2/2000 | Bullock et al. |
| 6,020,898 | A | 2/2000 | Saito et al. |
| 6,020,931 | A | 2/2000 | Bilbrey et al. |
| 6,022,099 | A | 2/2000 | Chwalek et al. |
| 6,023,524 | A | 2/2000 | Yamaguchi |
| 6,023,757 | A | 2/2000 | Nishimoto et al. |
| 6,028,611 | A | 2/2000 | Anderson et al. |
| 6,033,137 | A | 3/2000 | Ito |
| 6,034,740 | A | 3/2000 | Mitsui et al. |
| 6,038,491 | A | 3/2000 | McGarry et al. |
| 6,042,213 | A | 3/2000 | Hayasaki |
| 6,043,821 | A | 3/2000 | Sprague et al. |
| 6,046,768 | A | 4/2000 | Kaneda et al. |
| 6,047,130 | A | 4/2000 | Oles |
| 6,052,648 | A | 4/2000 | Burfeind et al. |
| 6,056,286 | A | 5/2000 | Koga |
| 6,057,850 | A | 5/2000 | Kichury |
| 6,061,179 | A | 5/2000 | Inoguchi et al. |
| 6,062,667 | A | 5/2000 | Matsui et al. |
| 6,069,642 | A | 5/2000 | Isobe |
| 6,074,042 | A | 6/2000 | Gasvoda et al. |
| 6,078,758 | A | 6/2000 | Patton et al. |
| 6,084,713 | A | 7/2000 | Rosenthal |
| 6,094,221 | A | 7/2000 | Anderson |
| 6,094,282 | A | 7/2000 | Hoda et al. |
| 6,097,431 | A | 8/2000 | Anderson et al. |
| 6,102,505 | A | 8/2000 | McIntyre et al. |
| 6,104,430 | A | 8/2000 | Fukuoka |
| 6,106,147 | A | 8/2000 | Silverbrook |
| 6,111,605 | A | 8/2000 | Suzuki |
| 6,118,484 | A | 9/2000 | Yokota et al. |
| 6,118,554 | A | 9/2000 | Horaguchi |
| 6,122,403 | A | 9/2000 | Rhoads |
| 6,133,951 | A | 10/2000 | Miyadera |
| 6,134,030 | A | 10/2000 | Kaneko et al. |
| 6,134,339 | A | 10/2000 | Luo |
| 6,134,353 | A | 10/2000 | Makram-Ebeid |
| 6,135,586 | A | 10/2000 | McClelland et al. |
| 6,136,212 | A | 10/2000 | Mastrangelo et al. |
| 6,137,509 | A | 10/2000 | Hayasaki |
| 6,137,521 | A | 10/2000 | Matsui |
| 6,141,036 | A | 10/2000 | Katayama et al. |
| 6,141,431 | A | 10/2000 | Munetsugu et al. |
| 6,144,414 | A | 11/2000 | Toba |
| 6,145,025 | A | 11/2000 | Lim |
| 6,147,704 | A | 11/2000 | Ito et al. |
| 6,149,256 | A | 11/2000 | McIntyre et al. |
| 6,157,394 | A | 12/2000 | Anderson et al. |
| 6,161,915 | A | 12/2000 | Bolash et al. |
| 6,163,340 | A | 12/2000 | Yasuda |
| 6,163,361 | A | 12/2000 | McIntyre et al. |
| 6,166,832 | A | 12/2000 | Fujimoto |
| 6,167,806 | B1 | 1/2001 | Chretinat et al. |
| 6,172,706 | B1 | 1/2001 | Tatsumi |
| 6,178,883 | B1 | 1/2001 | Satoh et al. |
| 6,181,377 | B1 | 1/2001 | Kobayashi |
| 6,181,379 | B1 | 1/2001 | Kingetsu et al. |
| 6,182,901 | B1 | 2/2001 | Hecht et al. |
| 6,188,430 | B1 | 2/2001 | Motai |
| 6,188,431 | B1 | 2/2001 | Oie |
| 6,196,541 | B1 | 3/2001 | Silverbrook |
| 6,198,489 | B1 | 3/2001 | Salesin et al. |
| 6,199,874 | B1 | 3/2001 | Galvin et al. |
| 6,199,969 | B1 | 3/2001 | Haflinger et al. |
| 6,201,571 | B1 | 3/2001 | Ota |
| 6,203,147 | B1 | 3/2001 | Battey et al. |
| 6,204,877 | B1 | 3/2001 | Kiyokawa |
| 6,211,911 | B1 | 4/2001 | Komiya et al. |
| 6,213,588 | B1 | 4/2001 | Silverbrook |
| 6,217,165 | B1 | 4/2001 | Silverbrook |
| 6,222,452 | B1 | 4/2001 | Ahlstrom et al. |
| 6,226,015 | B1 | 5/2001 | Danneels et al. |
| 6,227,643 | B1 | 5/2001 | Purcell et al. |
| 6,229,565 | B1 | 5/2001 | Bobry |
| 6,234,392 | B1 | 5/2001 | Murakami |
| 6,234,608 | B1 | 5/2001 | Genovese et al. |
| 6,236,431 | B1 | 5/2001 | Hirasawa et al. |
| 6,238,044 | B1 | 5/2001 | Silverbrook et al. |
| 6,252,976 | B1 | 6/2001 | Schildkraut et al. |
| 6,260,137 | B1 | 7/2001 | Fleck et al. |
| 6,262,769 | B1 | 7/2001 | Anderson et al. |
| 6,270,177 | B1 | 8/2001 | King et al. |
| 6,273,535 | B1 | 8/2001 | Inoue et al. |
| 6,278,481 | B1 | 8/2001 | Schmidt |
| 6,278,486 | B1 | 8/2001 | Hieda et al. |
| 6,278,491 | B1 | 8/2001 | Wang et al. |
| 6,280,106 | B1 | 8/2001 | Juan et al. |
| 6,285,410 | B1 | 9/2001 | Marai |
| 6,290,334 | B1 | 9/2001 | Ishinaga et al. |
| 6,292,574 | B1 | 9/2001 | Schildkraut et al. |
| 6,294,101 | B1 | 9/2001 | Silverbrook |
| 6,297,872 | B1 | 10/2001 | Imamura et al. |
| 6,300,976 | B1 | 10/2001 | Fukuoka |
| 6,304,291 | B1 | 10/2001 | Silverbrook |
| 6,304,684 | B1 | 10/2001 | Niczyporuk et al. |
| 6,304,825 | B1 | 10/2001 | Nowak et al. |
| 6,305,775 | B1 | 10/2001 | Ohtsuka et al. |
| 6,317,156 | B1 | 11/2001 | Nagasaki et al. |
| 6,317,192 | B1 | 11/2001 | Silverbrook et al. |
| 6,323,912 | B1 | 11/2001 | McIntyre |
| 6,325,380 | B1 | 12/2001 | Feigl et al. |
| 6,328,395 | B1 | 12/2001 | Kitahara et al. |
| 6,334,587 | B1 | 1/2002 | Roder |
| 6,357,865 | B1 | 3/2002 | Kubby et al. |
| 6,359,650 | B1 | 3/2002 | Murakami |
| 6,362,868 | B1 | 3/2002 | Silverbrook |
| 6,375,301 | B1 | 4/2002 | Childers et al. |
| 6,375,314 | B1 | 4/2002 | Reed et al. |
| 6,378,997 | B1 | 4/2002 | Nitta |
| 6,386,772 | B1 | 5/2002 | Klinefelter et al. |
| 6,390,589 | B1 | 5/2002 | Imanaka et al. |
| 6,407,777 | B1 | 6/2002 | DeLuca |
| 6,416,152 | B1 | 7/2002 | Matsuzaki et al. |
| 6,421,050 | B1 | 7/2002 | Ruml et al. |
| 6,425,661 | B1 | 7/2002 | Silverbrook et al. |
| 6,431,669 | B1 | 8/2002 | Silverbrook |
| 6,442,525 | B1 | 8/2002 | Silverbrook et al. |
| 6,472,052 | B1 | 10/2002 | Silverbrook |
| 6,489,990 | B1 | 12/2002 | Popovich |
| 6,493,031 | B1 | 12/2002 | Washizawa |
| 6,530,519 | B1 | 3/2003 | Suzuki |
| 6,543,880 | B1 | 4/2003 | Akhavain et al. |
| 6,546,187 | B1 | 4/2003 | Miyazaki et al. |
| 6,552,821 | B2 | 4/2003 | Suzuki |
| 6,573,927 | B2 | 6/2003 | Parulski et al. |
| 6,597,394 | B1 | 7/2003 | Duncan et al. |
| 6,606,171 | B1 | 8/2003 | Renk et al. |
| 6,608,297 | B2 | 8/2003 | Neukermans et al. |
| 6,618,091 | B1 | 9/2003 | Tamura |
| 6,622,276 | B2 | 9/2003 | Nagasaki et al. |
| 6,628,333 | B1 | 9/2003 | Gowda et al. |
| 6,633,332 | B1 | 10/2003 | Nay et al. |
| 6,634,814 | B2 | 10/2003 | Spurr et al. |
| 6,640,004 | B2 | 10/2003 | Katayama et al. |
| 6,655,776 | B2 | 12/2003 | Murray |
| 6,665,454 | B1 | 12/2003 | Silverbrook et al. |
| 6,670,985 | B2 | 12/2003 | Karube et al. |
| 6,678,402 | B2 | 1/2004 | Jones et al. |
| 6,702,417 | B2 | 3/2004 | Silverbrook |
| 6,727,948 | B1 | 4/2004 | Silverbrook |
| 6,727,951 | B1 | 4/2004 | Silverbrook |
| 6,736,321 | B2 | 5/2004 | Tsikos et al. |
| 6,738,903 | B1 | 5/2004 | Haines |
| 6,744,526 | B2 | 6/2004 | McDermott et al. |
| 6,745,331 | B1 | 6/2004 | Silverbrook |
| 6,750,901 | B1 | 6/2004 | Silverbrook |
| 6,750,944 | B2 | 6/2004 | Silverbrook et al. |
| 6,773,874 | B2 | 8/2004 | Silverbrook |
| 6,791,605 | B1 | 9/2004 | Reele et al. |
| 6,803,989 | B2 | 10/2004 | Silverbrook |
| 6,820,968 | B2 | 11/2004 | Silverbrook |
| 6,831,681 | B1 | 12/2004 | Silverbrook |
| 6,837,635 | B1 | 1/2005 | Juan |
| 6,847,883 | B1 | 1/2005 | Walmsley et al. |
| 6,858,837 | B2 | 2/2005 | Tabata |
| 6,870,566 | B1 | 3/2005 | Koide et al. |
| 6,879,341 | B1 | 4/2005 | Silverbrook |

| | | |
|---|---|---|
| 6,888,649 B2 | 5/2005 | Suzuki |
| 6,909,456 B1 | 6/2005 | Sasaki |
| 6,913,875 B2 | 7/2005 | Silverbrook |
| 6,918,542 B2 | 7/2005 | Silverbrook et al. |
| 6,918,654 B2 | 7/2005 | Silverbrook |
| 6,948,661 B2 | 9/2005 | Silverbrook et al. |
| 6,953,235 B2 | 10/2005 | Silverbrook |
| 6,954,254 B2 | 10/2005 | Silverbrook |
| 6,958,207 B1 | 10/2005 | Khusnatdinov et al. |
| 6,985,207 B2 | 1/2006 | Silverbrook |
| 7,044,589 B2 | 5/2006 | Silverbrook |
| 7,050,143 B1 | 5/2006 | Silverbrook et al. |
| 7,058,219 B2 | 6/2006 | Walmsley et al. |
| 7,063,940 B2 | 6/2006 | Silverbrook |
| 7,077,515 B2 | 7/2006 | Silverbrook |
| 7,083,108 B2 | 8/2006 | Silverbrook et al. |
| 7,084,951 B2 | 8/2006 | Silverbrook |
| 7,086,724 B2 | 8/2006 | Silverbrook |
| 7,092,011 B2 | 8/2006 | Silverbrook et al. |
| 7,095,433 B1 | 8/2006 | Touma et al. |
| 7,097,263 B2 | 8/2006 | Silverbrook |
| 7,110,024 B1 | 9/2006 | Silverbrook et al. |
| 7,110,139 B2 | 9/2006 | Silverbrook |
| 7,119,836 B2 | 10/2006 | Silverbrook |
| 7,140,723 B2 | 11/2006 | Silverbrook |
| 7,140,726 B2 | 11/2006 | Silverbrook |
| 7,156,512 B2 | 1/2007 | Silverbrook |
| 7,173,729 B2 | 2/2007 | Silverbrook et al. |
| 7,186,499 B2 | 3/2007 | Silverbrook |
| 7,187,404 B2 | 3/2007 | Silverbrook et al. |
| 7,227,576 B2 | 6/2007 | Umeyama |
| 7,234,645 B2 | 6/2007 | Silverbrook et al. |
| 7,234,801 B2 | 6/2007 | Silverbrook |
| 7,250,975 B2 | 7/2007 | Silverbrook |
| 7,278,723 B2 | 10/2007 | Silverbrook |
| 7,284,843 B2 | 10/2007 | Silverbrook |
| 7,291,447 B2 | 11/2007 | Silverbrook |
| 7,312,845 B2 | 12/2007 | Silverbrook |
| 7,357,497 B2 | 4/2008 | Silverbrook |
| 7,377,706 B2 | 5/2008 | Silverbrook et al. |
| 7,385,639 B2 | 6/2008 | Silverbrook |
| 7,404,633 B2 | 7/2008 | Silverbrook |
| 7,443,434 B2 | 10/2008 | Silverbrook |
| 7,452,048 B2 | 11/2008 | Silverbrook |
| 7,453,492 B2 | 11/2008 | Silverbrook |
| 7,483,053 B2 | 1/2009 | Silverbrook |
| 7,492,490 B2 | 2/2009 | Silverbrook |
| 7,505,068 B2 | 3/2009 | Silverbrook |
| 7,517,071 B2 | 4/2009 | Silverbrook |
| 7,524,045 B2 | 4/2009 | Silverbrook et al. |
| 7,525,687 B2 | 4/2009 | Silverbrook |
| 7,557,853 B2 | 7/2009 | Silverbrook |
| 7,575,313 B2 | 8/2009 | Silverbrook |
| 7,576,794 B2 | 8/2009 | Silverbrook |
| 7,576,795 B2 | 8/2009 | Silverbrook |
| 7,581,826 B2 | 9/2009 | Silverbrook |
| 7,590,347 B2 | 9/2009 | Silverbrook |
| 7,602,423 B2 | 10/2009 | Silverbrook |
| 7,621,607 B2 | 11/2009 | Silverbrook |
| 7,629,999 B2 | 12/2009 | Silverbrook |
| 7,633,535 B2 | 12/2009 | Silverbrook |
| 7,637,594 B2 | 12/2009 | Silverbrook et al. |
| 7,646,403 B2 | 1/2010 | Silverbrook et al. |
| 7,654,626 B2 | 2/2010 | Silverbrook et al. |
| 7,665,834 B2 | 2/2010 | Silverbrook |
| 7,690,765 B2 | 4/2010 | Silverbrook |
| 7,695,108 B2 | 4/2010 | Silverbrook |
| 7,701,506 B2 | 4/2010 | Silverbrook |
| 7,703,910 B2 | 4/2010 | Silverbrook |
| 7,705,891 B2 | 4/2010 | Silverbrook |
| 7,742,696 B2 | 6/2010 | Silverbrook |
| 7,750,971 B2 | 7/2010 | Silverbrook |
| 7,758,166 B2 | 7/2010 | Silverbrook |
| 7,773,125 B2 | 8/2010 | Silverbrook et al. |
| 7,796,166 B2 | 9/2010 | Silverbrook |
| 7,905,574 B2 | 3/2011 | Silverbrook |
| 7,936,395 B2 | 5/2011 | Silverbrook |
| 7,957,009 B2 | 6/2011 | Silverbrook |
| 7,965,416 B2 | 6/2011 | Silverbrook |
| 7,970,275 B2 | 6/2011 | Silverbrook |
| 2001/0007458 A1 | 7/2001 | Purcell et al. |
| 2001/0015760 A1 | 8/2001 | Fellegara et al. |
| 2001/0015818 A1 | 8/2001 | Kawanabe et al. |
| 2001/0040574 A1 | 11/2001 | Prater |
| 2002/0024603 A1 | 2/2002 | Nakayama et al. |
| 2002/0033854 A1 | 3/2002 | Silverbrook et al. |
| 2002/0054212 A1 | 5/2002 | Fukuoka |
| 2002/0063760 A1 | 5/2002 | Dietl et al. |
| 2002/0135266 A1 | 9/2002 | Boutaghou |
| 2002/0141750 A1 | 10/2002 | Ludtke et al. |
| 2003/0043273 A1 | 3/2003 | Suzuki |
| 2003/0076551 A1 | 4/2003 | Kawai et al. |
| 2004/0119827 A1 | 6/2004 | Silverbrook et al. |
| 2004/0125209 A1 | 7/2004 | Silverbrook |
| 2004/0196350 A1 | 10/2004 | Silverbrook |
| 2004/0201764 A1 | 10/2004 | Honda et al. |
| 2004/0257446 A1 | 12/2004 | Silverbrook |
| 2005/0088527 A1 | 4/2005 | Silverbrook |
| 2005/0146613 A1 | 7/2005 | Silverbrook et al. |
| 2006/0098232 A1 | 5/2006 | Nakano et al. |
| 2006/0126102 A1 | 6/2006 | Sakuda |
| 2006/0239676 A1 | 10/2006 | Parulski et al. |
| 2007/0024685 A1 | 2/2007 | Silverbrook |
| 2007/0040856 A1 | 2/2007 | Silverbrook |
| 2007/0046754 A1 | 3/2007 | Silverbrook |
| 2008/0002215 A1 | 1/2008 | Silverbrook et al. |
| 2008/0062232 A1 | 3/2008 | Silverbrook |
| 2008/0152414 A1 | 6/2008 | Silverbrook |
| 2008/0252732 A1 | 10/2008 | Silverbrook et al. |
| 2009/0052879 A1 | 2/2009 | Silverbrook |
| 2009/0141291 A1 | 6/2009 | Yumiki et al. |
| 2009/0207208 A1 | 8/2009 | Silverbrook et al. |
| 2009/0244292 A1 | 10/2009 | Silverbrook et al. |

FOREIGN PATENT DOCUMENTS

| | | |
|---|---|---|
| EP | 0398295 A2 | 11/1990 |
| EP | 520289 A2 | 12/1992 |
| EP | 0763930 A1 | 3/1997 |
| JP | 06-149051 | 5/1994 |
| JP | 09-069064 | 3/1997 |
| JP | 09-071015 | 3/1997 |
| JP | 09-116843 | 5/1997 |
| JP | 09-187040 | 7/1997 |
| WO | WO 95/16323 | 6/1995 |
| WO | WO 95/16323 A1 | 6/1995 |
| WO | WO 96/32265 A | 10/1996 |
| WO | WO 97/06958 A | 2/1997 |
| WO | WO 97/06958 A1 | 2/1997 |

US 8,102,568 B2

SYSTEM FOR CREATING GARMENTS USING CAMERA AND ENCODED CARD

CROSS REFERENCES TO RELATED APPLICATIONS

The present application is a continuation of U.S. application Ser. No. 12/422,892 filed Apr. 13, 2009, which is a continuation of U.S. application Ser. No. 11/525,862 filed Sep. 25, 2006, now issued U.S. Pat. No. 7,525,687, which is a continuation of U.S. application Ser. No. 10/326,308 filed Dec. 23, 2002 (now abandoned), which is a continuation of U.S. application Ser. No. 09/112,759 filed on Jul. 10, 1998 (now abandoned), the entire contents of which are herein incorporated by reference.

The following co-pending US patent applications, identified by their US patent application serial numbers (USSN), were filed simultaneously to the present application on Jul. 10, 1998, and are hereby incorporated by cross-reference

| | | | | | |
|---|---|---|---|---|---|
| 6,750,901 | 6,476,863 | 6,788,336 | 6,322,181 | 6,597,817 | 6,227,648 |
| 6,727,948 | 6,690,419 | 6,727,951 | 6,196,541 | 6,195,150 | 6,362,868 |
| 6,831,681 | 6,431,669 | 6,362,869 | 6,472,052 | 6,356,715 | 6,894,694 |
| 6,636,216 | 6,366,693 | 6,329,990 | 6,459,495 | 6,137,500 | 6,690,416 |
| 7,050,143 | 6,398,328 | 7,110,024 | 6,431,704 | 6,879,341 | 6,415,054 |
| 6,665,454 | 6,542,645 | 6,486,886 | 6,381,361 | 6,317,192 | 6,850,274 |
| 6,646,757 | 6,624,848 | 6,357,135 | 6,271,931 | 6,353,772 | 6,106,147 |
| 6,665,008 | 6,304,291 | 6,305,770 | 6,289,262 | 6,315,200 | 6,217,165 |
| 6,566,858 | 6,331,946 | 6,246,970 | 6,442,525 | 6,786,420 | 6,350,023 |
| 6,318,849 | 6,227,652 | 6,213,588 | 6,213,589 | 6,231,163 | 6,247,795 |
| 6,394,581 | 6,244,691 | 6,257,704 | 6,416,168 | 6,220,694 | 6,257,705 |
| 6,247,794 | 6,234,610 | 6,247,793 | 6,264,306 | 6,241,342 | 6,247,792 |
| 6,264,307 | 6,254,220 | 6,234,611 | 6,302,528 | 6,283,582 | 6,239,821 |
| 6,338,547 | 6,247,796 | 6,557,977 | 6,390,603 | 6,362,843 | 6,293,653 |
| 6,312,107 | 6,227,653 | 6,234,609 | 6,238,040 | 6,188,415 | 6,227,654 |
| 6,209,989 | 6,247,791 | 6,336,710 | 6,217,153 | 6,416,167 | 6,243,113 |
| 6,283,581 | 6,247,790 | 6,260,953 | 6,267,469 | 6,224,780 | 6,235,212 |
| 6,280,643 | 6,284,147 | 6,214,244 | 6,071,750 | 6,267,905 | 6,251,298 |
| 6,258,285 | 6,225,138 | 6,241,904 | 6,299,786 | 6,866,789 | 6,231,773 |
| 6,190,931 | 6,248,249 | 6,290,862 | 6,241,906 | 6,565,762 | 6,241,905 |
| 6,451,216 | 6,231,772 | 6,274,056 | 6,290,861 | 6,248,248 | 6,306,671 |
| 6,331,258 | 6,110,754 | 6,294,101 | 6,416,679 | 6,264,849 | 6,254,793 |
| 6,245,246 | 6,855,264 | 6,235,211 | 6,491,833 | 6,264,850 | 6,258,284 |
| 6,312,615 | 6,228,668 | 6,180,427 | 6,171,875 | 6,267,904 | 6,245,247 |
| 6,315,914 | 6,231,148 | 6,293,658 | 6,614,560 | 6,238,033 | 6,312,070 |
| 6,238,111 | 6,378,970 | 6,196,739 | 6,270,182 | 6,152,619 | 6,087,638 |
| 6,340,222 | 6,041,600 | 6,299,300 | 6,067,797 | 6,286,935 | 6,044,646 |
| 6,382,769 | | | | | |

STATEMENT REGARDING FEDERALLY SPONSORED RESEARCH OR DEVELOPMENT

Not applicable.

FIELD OF THE INVENTION

The present invention relates to an image processing method and apparatus and, in particular, discloses a Garment Design and Printing System.

The present invention further relates to the creation of fabrics and garments utilising automated apparatuses.

BACKGROUND OF THE INVENTION

A number of creative judgements are made when any garment is created. Firstly, there is the shape and styling of the garment and additionally, there is the fabric colours and style. Often, a fashion designer will try many different alternatives and may even attempt to draw the final fashion product before creating the finished garment.

Such a process is generally unsatisfactory in providing a rapid and flexible turn around of the garments and also providing rapid judgement of the final appearance of a fashion product on a person.

SUMMARY OF THE INVENTION

It is an object of the present invention to provide an alternative form for analysing the look of garments and for their creation. A further object of the present invention is to provide for automatic fabric creation.

In accordance with the first aspect of the present invention there is provided A garment creation system comprising:

an expected image creation system including an image sensor device and an image display device, said image creation system mapping portions of an arbitrary image sensed by said image sensor device onto a garment and outputting on said display device a depiction of said garment;

a garment fabric printer adapted to be interconnected to said image creation system for printing out corresponding pieces of said garment including said mapped portions.

BRIEF DESCRIPTION OF THE DRAWINGS

Notwithstanding any other forms which may fall within the scope of the present invention, preferred forms of the invention will now be described, by way of example only, with reference to the accompanying drawings which.

DESCRIPTION OF PREFERRED AND OTHER EMBODIMENTS

The preferred embodiment is preferably implemented through suitable programming of a hand held camera device such as that described in co-pending U.S. patent application Ser. No. 09/113,060 entitled "Digital Instant Printing Camera with Image Processing Capability" filed concurrently herewith by the present applicant the content of which is hereby specifically incorporated by cross reference.

The aforementioned patent specification discloses a camera system, hereinafter known as an "Artcam" type camera, wherein sensed images can be directly printed out by an Artcam portable camera unit. Further, the aforementioned specification discloses means and methods for performing various manipulations on images captured by the camera sensing device leading to the production of various effects in an output image. The manipulations are disclosed to be highly flexible in nature and can be implemented through the insertion into the Artcam of cards having encoded thereon various instructions for the manipulation of images, the cards hereinafter being known as Artcards. The Artcam further has significant onboard processing power provided by an Artcam Central Processor unit (ACP) which is interconnected to a memory device for the storage of important data and images.

Figure 1:
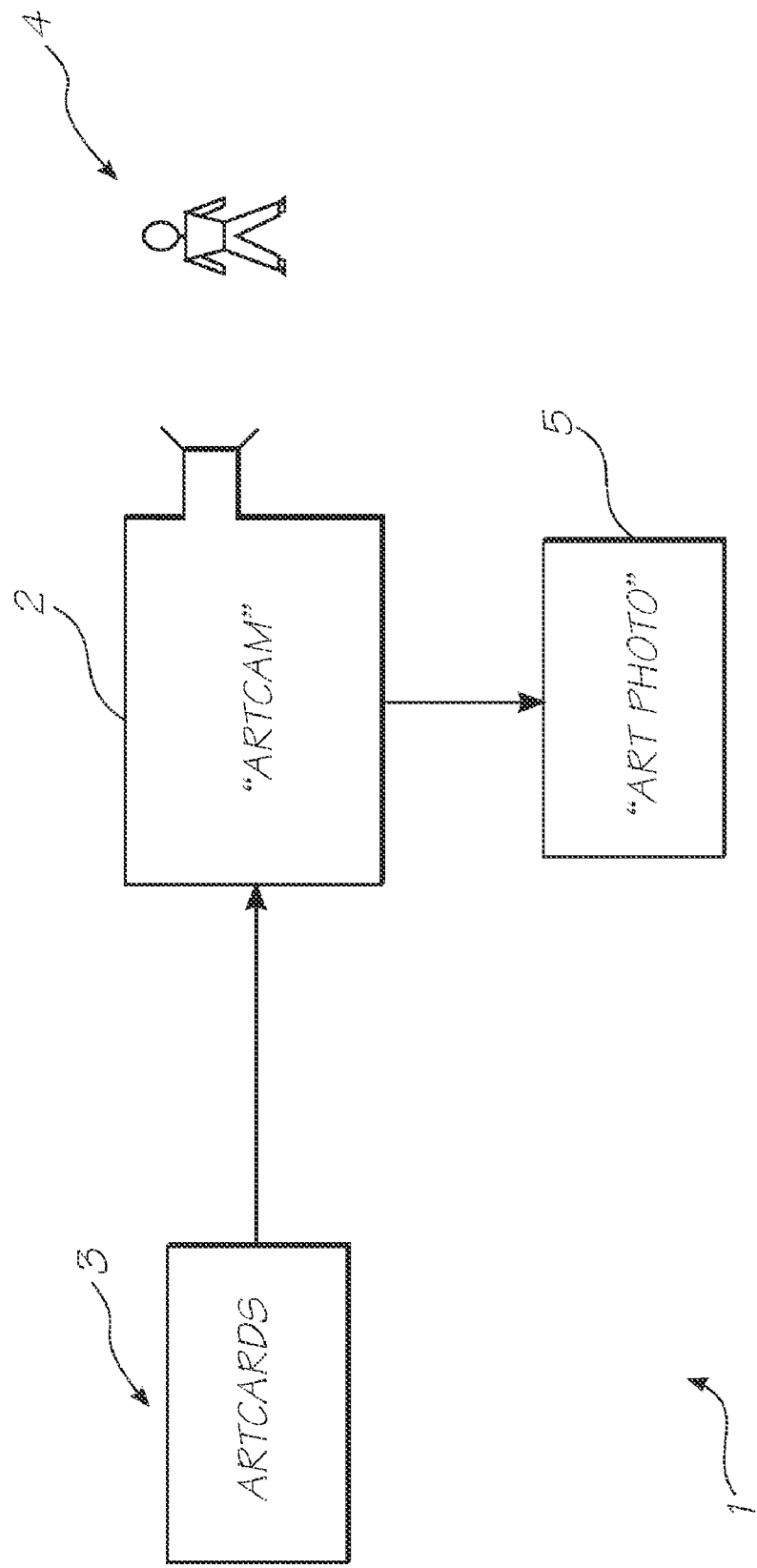
FIG. 1 illustrates the basic operation of an Artcam device.

The aforementioned patent specification discloses an Artcam system as indicated 1 in FIG. 1. The Artcam system 1 relies on an Artcam 2 which takes Artcards 3 as an input. The Artcard 3 includes encoded information for manipulation of an image scene 4 so as to produce an output photo 5 which contains substantial manipulation in accordance with the instruction of Artcard 3. The Artcards 3 are designed to be extremely inexpensive and contain on one surface the encoding information and on the other surface a depiction of the likely effect which will be produced by the Artcard 3 when inserted in Artcam 2.

Figure 2:
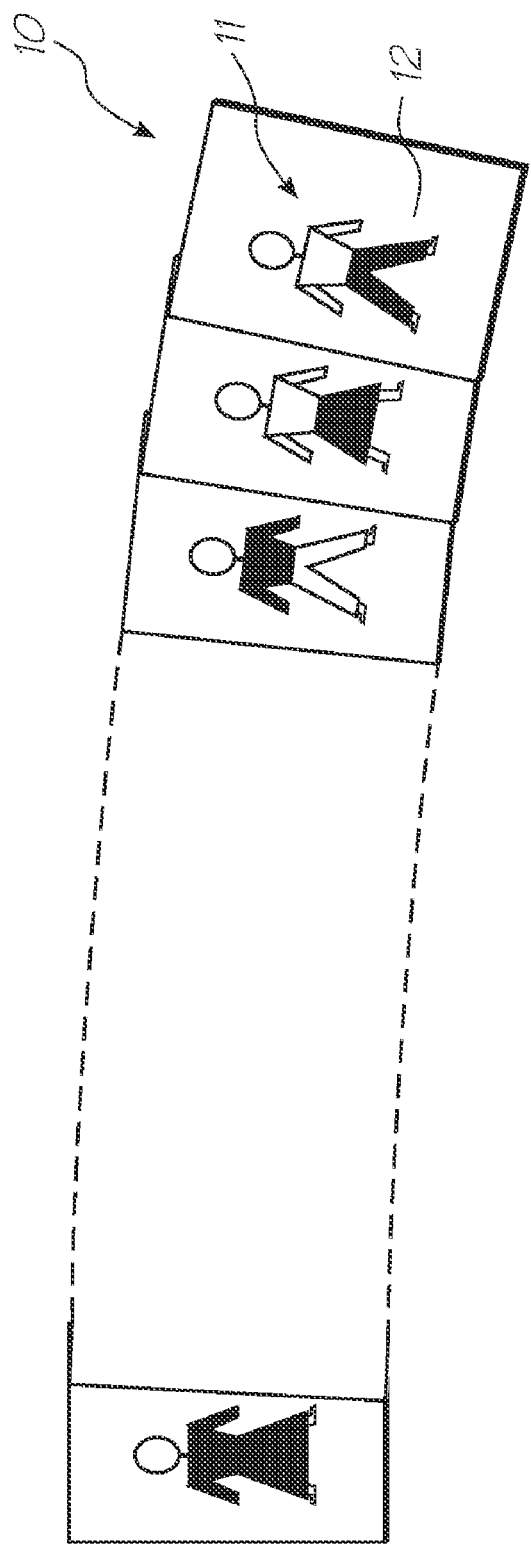
FIG. 2 illustrates a series of Artcards for use with the preferred embodiment.
Figure 3:
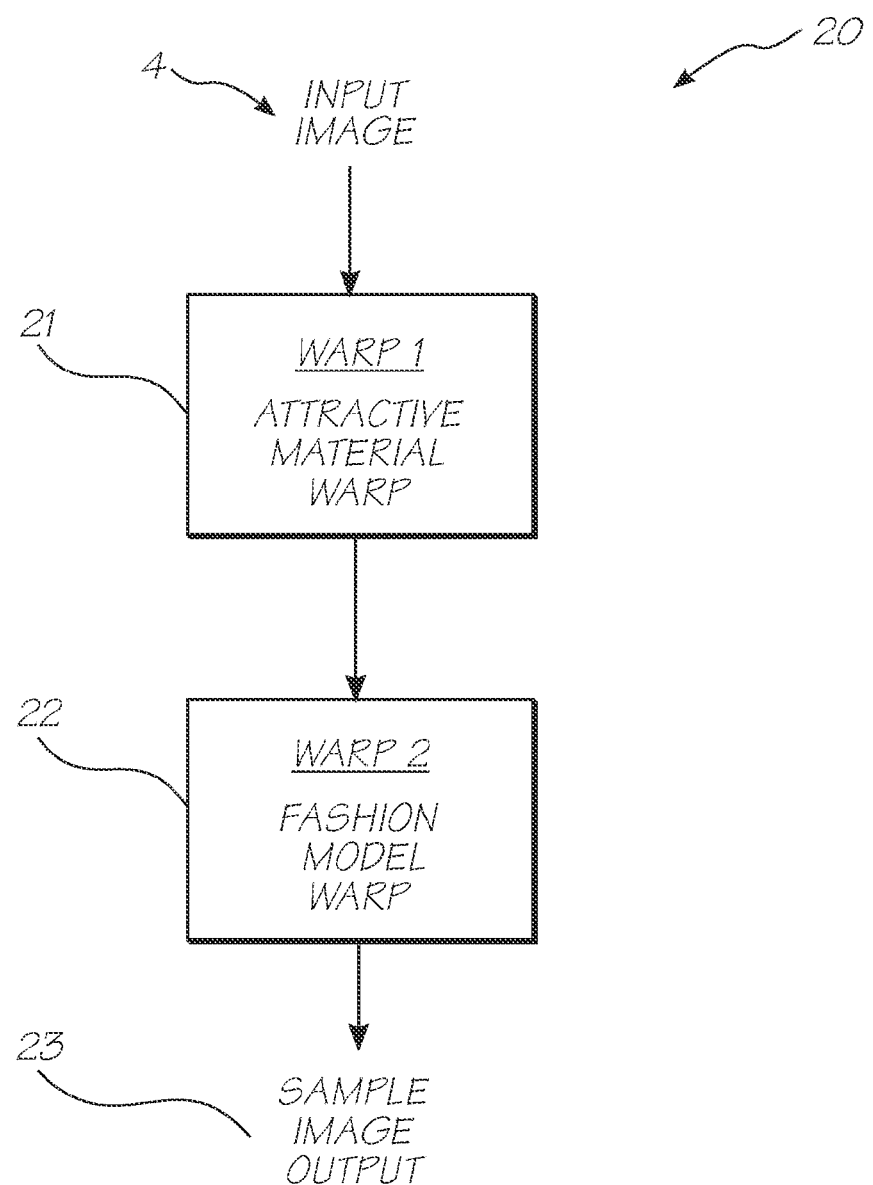
FIG. 3 is a flow diagram of the algorithm utilised by the preferred embodiment.

In accordance with the method of the preferred embodiment, as shown in FIG. 2, a large number of Artcards 3 are prepared and distributed in packs 10. Each pack 10 relates to clothing wear of a specific size and includes images eg. 11 of models having clothing apparel 12 on to which an image captured by the camera will be mapped. The mapping can be to different items of apparel on different Artcards 3. One form of mapping algorithm is as illustrated 20 in FIG. 3 wherein the input image 4 is first warped 21 utilising a warp map which maps the image to a repeating tiling pattern that produces attractive warping effects. Of course, many other forms of algorithms could be provided for producing an attractive form of material with the algorithm being provided on Artcard 3 (FIG. 1).

Next, a second warp 22 is provided for warping the output of first warp map 21 onto the specific model image in the Artcard. Therefore, warp 22 will be Artcard specific. The result can then be output 23 for printing as an art photo 5. Hence, a user is able to point an Artcam 2 at a design image 4 and produce art photo 5 which has a manipulated version of the image based upon a model's item of fashion apparel or garment. This process can be continued until a desirable result is produced.

Figure 4:
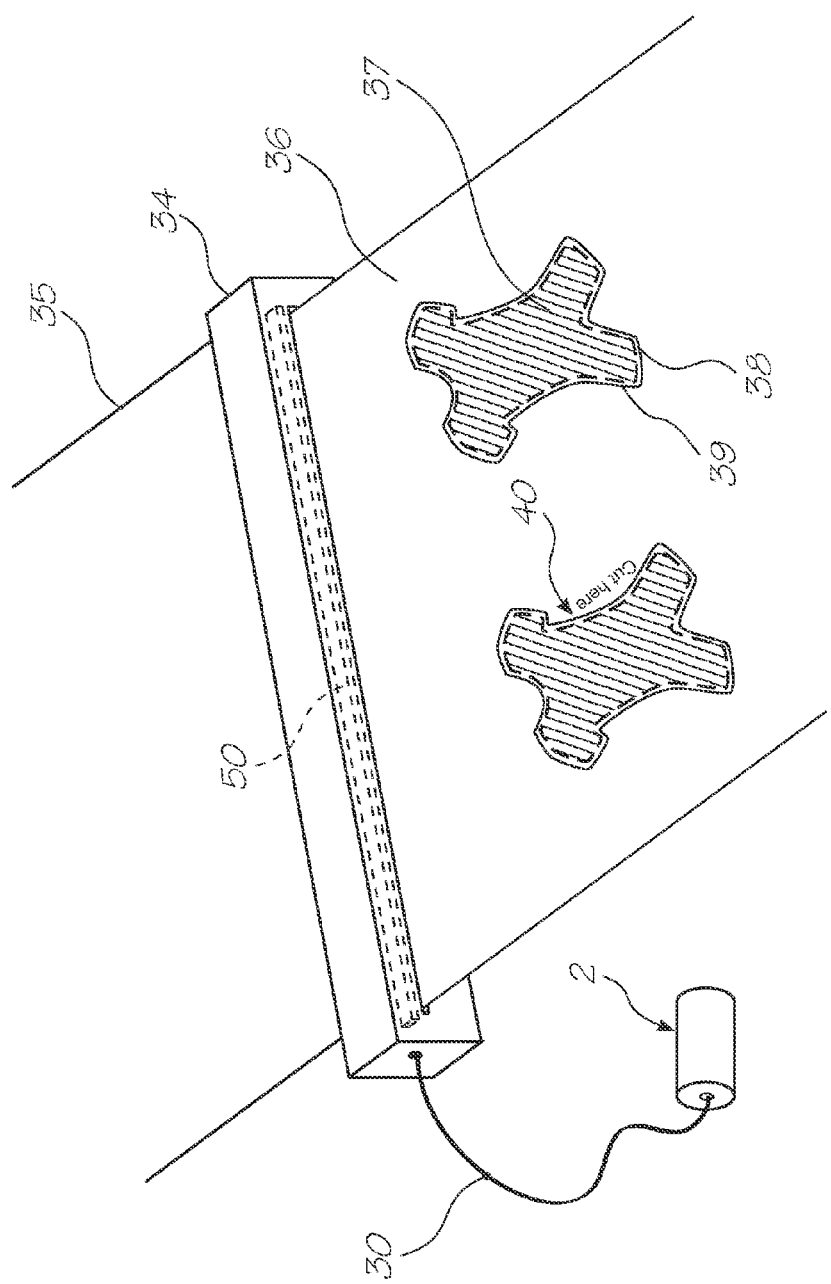
FIG. 4 is a schematic illustration of the outputting of printed fabrics produced in accordance with the present invention.

Next, as indicated in FIG. 4, when a final selection has been made, the Artcam 2 can be connected by its USB port, as illustrated at 30, to a fabric printer 34 which can comprise an ink jet fabric printer and associated drive controller electronics etc. The printer 34 comprises a printhead 50 having a width corresponding to the width of a bolt of fabric. Either the Artcam 2 or the ink jet printer 34 can be programmed to print out on fabric 35 the garment pieces eg. 36 having on the surface 37 thereof the original warped image so as to produce a garment corresponding to that depicted by the model on the Artcard.

The output fabric can include tab portions eg. 38 for alignment and border regions eg. 39 in addition to instructions 40 for joining the garment pieces together. Preferably, the output program includes providing for warp matching of border regions so as to present a continuous appearance on the garment cross seams. Additionally, a user interface could be provided for utilising the same Artcard with many different output sizes so as to taken into account different shaped bodies. By utilisation of Artcam technology, a system can be provided for customised production of garments and rapid depiction of the likely results by means of utilisation of the Artcam device 2.

It would be appreciated by a person skilled in the art that numerous variations and/or modifications may be made to the present invention as shown in the specific embodiment without departing from the spirit or scope of the invention as broadly described. The present embodiment is, therefore, to be considered in all respects to be illustrative and not restrictive.

I claim:

1. A garment creation system comprising:
    (a) a card having printed thereon:
        a depiction of a garment; and
        encoded information carrying instructions for generating one or more garments pieces corresponding to the garment and manipulating an input image so as to be mapped onto said one or more garment pieces; and
    (b) a camera and processing system configured for:
        optically reading the encoded information printed on said card;
        capturing an image;
        mapping the captured image onto one of more garment pieces in accordance with the encoded information;
        generating print data for said one or more garment pieces, said print data including an outline of said one or more garment pieces and a decorative finish for said one or more garment pieces based on said encoded information; and
        communicating the print data to a garment fabric printer for printing said outline and said decorative finish on to a surface of a bolt of fabric.

2. A garment creation system as claimed in claim 1 wherein the print data for the outline includes instructions for joining said garment pieces together.

3. The garment creation system as claimed in claim 1 further comprising the garment fabric printer.

4. The garment creation system as claimed in claim 3, wherein the printer comprises a printhead having a width corresponding to the width of a bolt of fabric.

* * * * *